(12) United States Patent
He

(10) Patent No.: US 12,300,094 B2
(45) Date of Patent: May 13, 2025

(54) WEARABLE APPARATUS AND INFORMATION NOTIFICATION METHOD

(71) Applicant: ARASHI VISION INC., Shenzhen (CN)

(72) Inventor: Kehui He, Shenzhen (CN)

(73) Assignee: ARASHI VISION INC., Shenzhen (CN)

(*) Notice: Subject to any disclaimer, the term of this patent is extended or adjusted under 35 U.S.C. 154(b) by 0 days.

(21) Appl. No.: 18/028,519

(22) PCT Filed: Sep. 24, 2021

(86) PCT No.: PCT/CN2021/120274
§ 371 (c)(1),
(2) Date: Mar. 24, 2023

(87) PCT Pub. No.: WO2022/063222
PCT Pub. Date: Mar. 31, 2022

(65) Prior Publication Data
US 2023/0334964 A1   Oct. 19, 2023

(30) Foreign Application Priority Data

Sep. 24, 2020   (CN) .......................... 202011014203.8

(51) Int. Cl.
*G08B 6/00*   (2006.01)
*G03B 17/08*   (2021.01)
*H04N 23/50*   (2023.01)

(52) U.S. Cl.
CPC .............. *G08B 6/00* (2013.01); *G03B 17/08* (2013.01); *H04N 23/50* (2023.01)

(58) Field of Classification Search
CPC .......... G08B 6/00; G08B 21/24; G03B 17/08; H04N 23/50; H04N 23/00; F16M 13/04
(Continued)

(56) References Cited

U.S. PATENT DOCUMENTS

2013/0010992 A1* 1/2013 Koester .................. H04R 25/60
381/322
2015/0243157 A1* 8/2015 Choi .................... E05B 73/0005
340/571
(Continued)

FOREIGN PATENT DOCUMENTS

CN   204655957 U     9/2015
CN   105190716 A  * 12/2015
(Continued)

*Primary Examiner* — Omar Casillashernandez
(74) *Attorney, Agent, or Firm* — XSENSUS LLP

(57) ABSTRACT

A wearable apparatus, comprising a housing, a battery assembly, a mainboard assembly, a wearable structure, and a vibration motor for notifying a user, wherein the mainboard assembly and the vibration motor are arranged in the housing, and the wearable structure is connected to the housing. An information notification method. In the method, a wearable structure is used to connect a wearable apparatus to the body of a user, and a corresponding operation prompt is fed back by means of the vibration of the vibration motor during use, thereby notifying the user that the apparatus has completed execution without the need for the user to observe the apparatus with the naked eye, thus improving the use experience of the user.

16 Claims, 1 Drawing Sheet

(58) Field of Classification Search
USPC .................................................... 340/407.1
See application file for complete search history.

(56) References Cited

U.S. PATENT DOCUMENTS

2017/0351164 A1* 12/2017 Kim .................... H04N 23/51
2018/0240621 A1    8/2018 Oomori et al.

FOREIGN PATENT DOCUMENTS

| | | | |
|---|---|---|---|
| CN | 105376465 | A | 3/2016 |
| CN | 105630159 | A | 6/2016 |
| CN | 105788921 | A | 7/2016 |
| CN | 206039372 | U | 3/2017 |
| CN | 107493410 | A * | 8/2017 |
| CN | 207039741 | U | 2/2018 |
| CN | 207543215 | U | 6/2018 |
| CN | 108319361 | A | 7/2018 |
| CN | 109254652 | A | 1/2019 |
| CN | 112330939 | A | 2/2021 |
| KR | 10-2018-0079912 | A | 7/2018 |

* cited by examiner

WEARABLE APPARATUS AND INFORMATION NOTIFICATION METHOD

CROSS REFERENCE TO RELATED APPLICATIONS

The present invention is a 35 U.S.C. § 371 National Phase conversion of International (PCT) Patent Application No. PCT/CN2021/120274, filed on Sep. 24, 2021, which claims benefit of Chinese Application No. 202011014203.8, filed on Sep. 24, 2020, the disclosure of which is incorporated by reference herein. The PCT International Patent Application was filed and published in Chinese.

BACKGROUND OF THE INVENTION

Field of the Invention

The present invention relates to the field of electronic equipment, and in particular to a wearable apparatus and an information notification method.

Description of Related Art

A Wearable apparatus is a portable device that can be carried with a user. When in use, it is generally worn on the user's body or hung on the user's clothing. When there is a message prompt, it is often reminded by a prompt light or a prompt sound. The prompt light requires the user to observe directly with the naked eyes. When the wearable apparatus is worn on the user's head and chest, it is often difficult for the user to observe the state of the wearable apparatus, which is inconvenient to use; and as for the prompt sound, in a noisy environment, the prompt effect is not good, and the user cannot directly feel it, and some scenes are not convenient to use the prompt sound.

Technical Problem

The present invention aims to solve at least one of the above-mentioned technical problems, and provides a wearable apparatus and information notification method. It uses a wearable structure to connect the wearable apparatus to the user, and feeds back the corresponding operation prompts through the vibration of the vibration motor during use, thereby notifying the user that the wearable apparatus has been executed, without the need for the user to observe the wearable apparatus with the naked eyes, thereby improving the user's experience.

Technical Solution

The present invention discloses a wearable apparatus. The wearable apparatus includes a housing, a battery assembly, a mainboard assembly, a wearable structure and a vibration motor for notifying the user. The mainboard assembly and the vibration motor are arranged in the housing, and the wearable structure is connected to the housing.

Optionally, the housing includes a middle frame and a front shell connected to the front of the middle frame. The middle frame is provided with a button switch connected to the mainboard assembly. The mainboard assembly is provided with a trigger circuit, which can make the vibration motor work after the trigger circuit is triggered by the button switch. One end of the front shell is a button portion, and the button portion is close to the button switch and triggers the button switch.

Optionally, the middle frame is provided with a button hole, and the button hole is connected with a waterproof elastic member. One side of the button portion close to the middle frame is provided with a button protrusion facing the waterproof elastic member; and/or, the other end of the front shell is a fixed portion connected to the middle frame. There is a gap between the button portion and the middle frame for the button portion to be close to the button switch.

Optionally, the housing further includes a rear shell connected to the back of the middle frame, and/or, the vibration motor is adhered, glued or clamped to the middle frame.

Optionally, the wearable structure includes a first magnetic member and a wearable accessory that can be worn on the body of a user or clothing. The first magnetic member is arranged in the housing and connected to the back of the housing, and the wearable accessory is provided with a second magnetic member capable of attracting the first magnetic member.

Optionally, the wearable accessory is a magnetic lanyard or a magnetic headband or a magnetic pad.

Optionally, the wearable structure includes a wearable clip, the wearable clip is magnetically adsorbed or clipped to the housing, and the wearable clip can be clamped to the clothing.

Optionally, the wearable apparatus is a wearable camera, the wearable apparatus also includes a lens assembly, the housing is provided with a lens hole, and the lens assembly is connected to the lens hole; and the lens assembly and the vibration motor are respectively adjacent to opposite sides of the housing.

The present invention also discloses an information notification method for the aforementioned wearable apparatus, including the following steps:
  connecting the wearable apparatus to the body of a user or clothing through the wearable structure;
  receiving by the button portion a press operation, and the button portion triggering the button switch;
  the wearable apparatus performing a corresponding operation; and
  the vibration motor sending a vibration feedback when the wearable apparatus performs the operation, and/or, the vibration motor sending a vibration feedback after the wearable apparatus performs the operation.

Optionally, the operation includes powering on, powering off, taking pictures or recording videos.

Beneficial Effects

According to a wearable apparatus and information notification method disclosed by the present invention, the wearable apparatus is worn on the body of the user through a wearable structure. When the user uses the wearable apparatus to perform operations, such as powering on and off and taking pictures, the wearable apparatus will use the vibration motor to send vibration feedback after performing the corresponding operations to remind the user of the state of the wearable apparatus. In this way, when the wearable apparatus is worn at a position where the user cannot observe with the naked eyes, it is unnecessary for the user to directly observe with the naked eyes to know whether the operation of the wearable apparatus has been completed, thereby improving the user experience.

BRIEF DESCRIPTION OF THE DRAWINGS

In order to more clearly illustrate the technical solution in the embodiments of the present invention, the following will briefly introduce the accompanying drawings that need to be used in the embodiments. Apparently, the drawings in the following description are only some embodiments of the present invention, and those skilled in the art can obtain other drawings according to these drawings without creative efforts.

Figure 1:
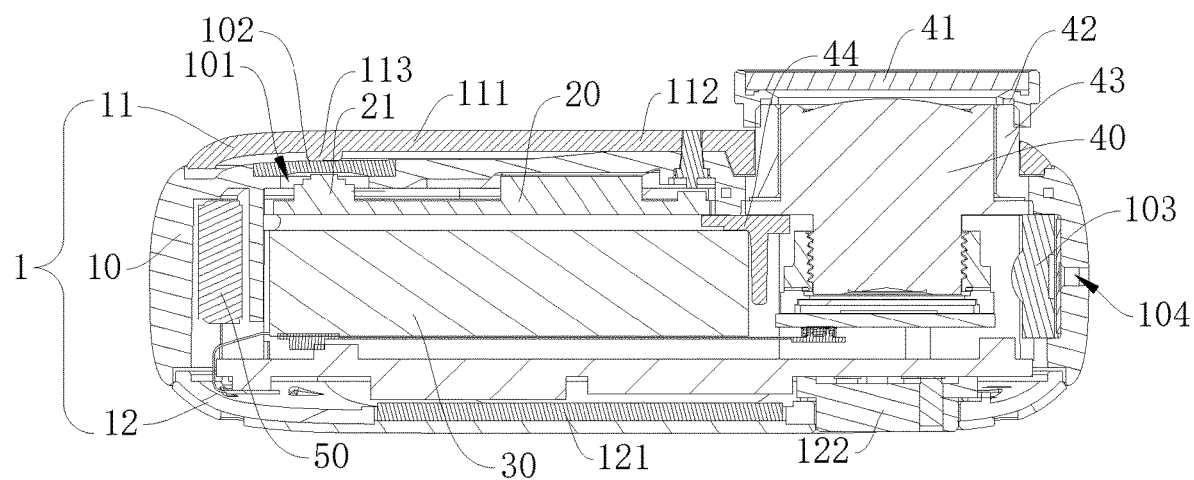
FIG. 1 is a cross-sectional view of a wearable apparatus provided by an embodiment of the present invention.

In the figures: 1 represents a housing; 10 represents a middle frame; 101 represents a button hole; 102 represents a waterproof elastic member; 103 represents a waterproof breathable membrane; 104 represents a microphone hole; 11 represents a front shell; 111 represents a button portion; 112 represents a fixed portion; 113 represents a button protrusion; 12 represents a rear shell; 121 represents a first magnetic member; 122 represents a pogo pin connector; 20 represents a mainboard assembly; 21 represents a button switch; 30 represents a battery assembly; 40 represents a lens assembly; 41 represents a lens protector; 42 represents a waterproof ring; 43 represents a lens ring; 44 represents a lens holder; and 50 represents a vibration motor.

DETAILED DESCRIPTION OF THE INVENTION

In order to make the object, technical solution and advantages of the present invention clearer, the present invention will be further described in detail below in conjunction with the accompanying drawings and embodiments. It should be understood that the specific embodiments described here are only used to explain the present invention, not to limit the present invention.

It should be noted that the terms "disposing" and "connecting" should be understood in a broad sense, for example, they can be directly disposed and connected, or indirectly disposed and connected through an intermediate component or structure.

In addition, embodiments of the present invention adopt "longitudinal", "transverse", "length", "width", "thickness", "upper", "lower", "front", "rear", "left", "right" ", "vertical", "horizontal", "top", "bottom", "inner", "outer" and other terms indicating orientation or positional relationship. They are based on the orientation or positional relationship shown in the drawings or the conventional placement state or use state, which are only for the convenience of describing the present invention and simplifying the description, rather than indicating or implying that the structure, feature, device or element referred to must have a specific orientation or positional relationship, nor necessarily constructed and operated in a particular orientation. Therefore, it should not be construed as limiting the invention. In the description of the present invention, unless otherwise specified, "plurality" means two or more.

The various specific technical features and various embodiments described in the specific implementation manners can be combined in any suitable manner if there is no contradiction, for example, the combination of different specific technical features/embodiments/implementation methods can form different implementations. In order to avoid unnecessary repetition, various possible combinations of specific technical features/embodiments/implementations in the present invention will not be further described.

Figure 2:
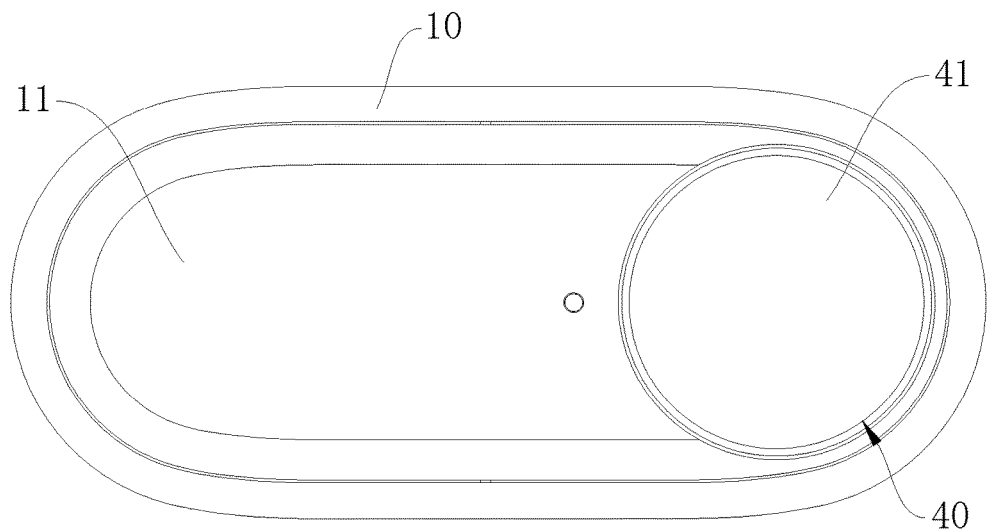
FIG. 2 is a front view of a wearable apparatus provided by an embodiment of the present invention.

One embodiment of the present invention provides a wearable apparatus. Referring to FIG. 1 and FIG. 2, the wearable apparatus includes a housing 1, a battery assembly 30, a mainboard assembly 20, a vibration motor 50 and a wearable structure. Here, the mainboard assembly 20 and the vibration motor 50 are installed in the housing 1, and the wearable structure is connected to the housing 1. In some exemplary embodiments, when using the wearable apparatus of this embodiment, the wearable apparatus can be worn on the user's body or clothing through the wearable structure connected to housing 1. The wearing position of the wearable apparatus can be determined according to different usage requirements and different application scenarios, such as wearing on the head, wrist or chest, etc. Of course, it can also be hung on the user's clothing, and can change position at any time after wearing. After wearing the wearable apparatus, the user can operate the wearable apparatus, such as turning on or off the wearable apparatus or taking pictures. When the user performs a corresponding operation, the vibration motor 50 vibrates to notify the user, and after the wearable apparatus has performed the corresponding operation, the vibration motor 50 can also vibrate again to notify the user that the operation is completed. In addition, the vibration motor 50 can notify the user with different vibration modes according to different operations of the user, such as a long vibration, a short vibration, or different vibration times, that is, different vibration modes correspond to different notifying contents. In this way, the user is able to know the state of the wearable apparatus in time, and when the wearable apparatus is worn on a position where the user cannot directly observe with the naked eyes or it is inconvenient for the user to observe, such as the head or the chest, through the vibration feedback of the vibration motor 50, the user can know in time whether the wearable apparatus has completed the operation, so as to improve the use experience of the user. Compared with prompt means such as prompt lights or prompt sounds used in the prior art, the wearable apparatus provided in this embodiment directly acts on the human skin through vibration feedback, the user is more likely to feel the feedback. Especially in the outdoor environment and when the user is doing exercise, the outdoor environment is complex, and it is difficult for the user to observe the prompt light and receive the prompt sound, and resultantly, the user cannot know whether the operation is executed in time. In addition, in some specific occasions, it is not appropriate to use prompt lights or prompt sounds. However, the vibration feedback of the wearable apparatus in this embodiment can directly act on the user's skin, and different vibration frequencies and vibration modes can be set according to different operations, thereby improving the user's experience.

In specific applications, the mainboard assembly 20 can be selectively provided with various functional modules according to the functions of the wearable apparatus itself, such as a processor module for processing data or a communication module for sending and receiving data. When the data of the wearable apparatus is processed by a cloud, the mainboard assembly 20 may not be provided with a processor module, but may only be provided with a communication module which is used to upload relevant data to the cloud server and then receive the data through the communication module after the data is processed. Of course, if necessary, the wearable apparatus may not be provided with the mainboard assembly 20.

Referring to FIG. 1, as one of the optional implementations of this embodiment, a housing 1 includes a middle frame 10 and a front shell 11, the front shell 11 is connected to the front of the middle frame 10, a button switch 21 is arranged in the middle frame 10, and the mainboard assembly 20 is provided with a trigger circuit for making the vibration motor 50 work. The button switch 21 is connected to the trigger circuit of the mainboard assembly 20, and the trigger circuit is triggered by the button switch 21. One end of the front shell 11 is a button portion 111 that can be close to the button switch 21 and trigger the button switch 21. In a specific application, when the wearable apparatus is worn on the user, it can be operated through the button portion 111 of the front shell 11. According to the times and ways of pressing the button portion 111, such as short press, long press, single click or double click, it can correspond to different specific operations of the wearable apparatus. Moreover, different operations can correspond to different vibration modes of the vibration motor 50, for example, the vibration motor 50 notifies the user with different vibration durations or different vibration intervals. Of course, the vibration motor 50 can also generate vibrations of different intensities, for example, vibration at 100% of the rated speed or vibration at 50% of the rated speed. When the button portion 111 is pressed and the button switch 21 is triggered, the trigger circuit can make the vibration motor 50 vibrate to notify the user that the button switch 21 has been triggered, and after the wearable apparatus performs the corresponding operation, the trigger circuit can make the vibration motor 50 vibrate again to notify the user that the operation is complete.

In addition, in this embodiment, the button portion 111 can be designed integrally with the front shell 11, so that when the wearable apparatus is worn at a position where the user cannot see it with the naked eyes, the user can directly press the front shell 11 to operate, which is convenient for the user and which also improves user's experience.

Referring to FIG. 1, as one of the optional implementations of this embodiment, the middle frame 10 is provided with a button hole 101 which is connected with a waterproof elastic member 102, and one side of the button portion 111 close to the middle frame 10 is provided with a button protrusion 113 facing the waterproof elastic member 102. In this embodiment, the housing 1 has a relatively airtight receiving cavity therein, and the battery assembly 30, the mainboard assembly 20 and the button switch 21 are accommodated in the cavity. On the premise that the button portion 111 can trigger the button switch 21, the waterproof elastic member 102 can prevent external liquid from penetrating into the cavity from the button hole 101, and improve the waterproof performance of the wearable apparatus. In a specific application, the battery assembly 30 can also be detachably connected to the housing 1, so that the battery assembly 30 can be replaced at any time to ensure the battery life of the wearable apparatus.

Referring to FIG. 1, as one of the optional implementations of this embodiment, the other end of the front shell 11 has a fixed portion 112 connected to the middle frame 10, and there is a gap between the button portion 111 and the middle frame 10, and the gap can be used for the button portion 111 to be close to the button switch 21. In this way, by the fixed portion 112 connected to the middle frame 10 and the suspended button portion 111, the front shell 11 forms a cantilever structure. When the button portion 111 is pressed, the button portion 111 can approach and trigger the button switch 21 through the gap, and after the external force is removed, the button portion 111 can be automatically restored. In this way, the gap can be used to increase the travel distance of the button portion 111 and improve the user's operating feel.

Specifically, the front shell 11 and the middle frame 10 can be made of elastic materials, such as plastic. The fixed portion 112 of the front shell 11 can be connected to the middle frame 10 by bonding, clamping or integral molding.

Further, as one of the optional implementations of this embodiment, the housing 1 further includes a rear shell 12 connected to the back of the middle frame 10, and/or the vibration motor 50 can be bonded, glued or clamped to the middle frame 10, thus preventing the vibration motor 50 from loosening due to vibration, and improving the reliability of the wearable apparatus. In this embodiment, the rear shell 12 can be made of metal material. After T-treatment of NMT (Nano Molding Technology), the rear shell 12 and the middle frame 10 can be connected together via NMT, so that the rear shell 12 and the middle frame 10 can be firmly fixed.

Referring to FIG. 1, as an optional implementation of this embodiment, the wearable structure includes a first magnetic member 121 and a wearable accessory that can be worn on the body of a user or clothing. The first magnetic member 121 can be arranged in the housing 1 and connected to the back of the housing 1, and the wearable accessory is provided with a second magnetic member that can attract the first magnetic member 121. In a specific application, the wearable apparatus can be worn on the user's body or clothing with the help of the attraction effect between the first magnetic member 121 and the second magnetic member, so as to facilitate the installation and removal of the wearable apparatus by the user.

Further, as one of the optional implementations of this embodiment, the wearable accessory can be a magnetic lanyard or a magnetic headband or a magnetic pad. Here, the magnetic lanyard can be hung on the user's neck, and the housing 1 can be attached to the user's chest; the magnetic headband can be tied to the user's head, and the housing 1 can be attached to the user's forehead; while the magnetic pad can attract the housing 1 to the user's clothing through the clothing, and its position can be adjusted according to actual needs. Of course, in other implementation manners, other wearable accessories may also be used.

As one of the optional implementations of this embodiment, the wearable structure can also include a wearable clip which is magnetically attracted or snapped to the housing 1, and the wearable clip can be snapped to the clothing, so that the wearable apparatus can also be worn on the user.

As one of the optional implementations of this embodiment, the wearable apparatus may be a wearable camera, [and] the wearable camera further includes a lens assembly 40, and the vibration motor 50 and the lens assembly 40 are respectively located on opposite sides of the housing 1. The housing 1 is provided with a lens hole, and the lens assembly 40 passes through the lens hole and protrudes from the front shell 11. Of course, in other implementation manners, the wearable apparatus can also be devices such as watches, bracelets, or earphones.

In this embodiment, the first magnetic member 121 and the lens assembly 40 face in different directions, so as to ensure that after the wearable apparatus is worn, the shooting of the lens assembly 40 will not be blocked by the user's body or clothing.

Specifically, the lens assembly 40 is connected with a lens ring 43, a lens protector 41 and a waterproof ring 42. Here, the lens ring 43 is sleeved on the outside of the lens assembly 40, the lens protector 41 is connected to the front end of the lens assembly 40 (that is, protruding from the end of the front shell 11), and the waterproof ring 42 is located between the lens ring 43 and the lens protector 41. In this way, external liquid can be prevented from penetrating into the middle frame 10 from the place, and the waterproof performance of the wearable apparatus can be improved. In addition, in this embodiment, a lens holder 44 is provided between the battery assembly 30 and the lens assembly 40, and the lens holder 44 can be used to support the lens assembly 40 and the mainboard assembly 20.

Specifically, the housing 1 is in an oblong shape in this embodiment, and the sides of the housing 1 (that is, the sides around the middle frame 10) can be arc-shaped transition. Certainly, in other implementations, the housing 1 may also be in other shapes or structures, such as a rectangle. The vibration motor 50 can be located at one side of the housing 1, the lens assembly 40 can be located at the other side thereof, and the battery assembly 30 can be located between the lens assembly 40 and the vibration motor 50, so that the center of gravity of the wearable apparatus can be close to the middle position of the housing 1. In this way, when the wearable apparatus is worn on the user, the wearable apparatus can remain relatively stable and not easy to fall off. The vibration motor 50 can be completely fitted with the side wall of the middle frame 10, so that the vibration of the vibration motor 50 can be transmitted to the housing 1 as much as possible, and then transmitted to the user's skin through the housing 1. In another embodiment, in order to further improve the experience of the user, two or more vibration motors 50 can be used, and the vibration motors 50 can also be fitted close to the rear shell 12. The rear shell 12 is closest to the user's skin, the vibration motor 50 is arranged there, which can make the user feels more strongly. In addition, the vibration motor 50 in this embodiment can be a linear motor, which can provide a good vibration experience and can improve user's experience. Of course, a rotor motor can also be used.

Referring to FIG. 1, specifically, in this embodiment, the wearable apparatus may also include a pogo pin connector 122 (pogo pin) and a microphone (not shown in the figure). The pogo pin connector 122 can be located in the rear shell 12, and is used for charging and data transmission of the wearable apparatus, while the microphone can be located in the middle frame 10. The middle frame 10 is provided with a microphone hole 104 and a waterproof breathable membrane 103, the microphone faces the microphone hole 104, the waterproof breathable membrane 103 can prevent liquid from entering the middle frame 10 from the microphone hole 104, and does not block the passage of sound, so as to ensure the normal operation of the microphone.

An embodiment of the present invention also provides an information notification method for the above wearable apparatus, including the following steps:
connecting a wearable apparatus to the body or clothing of a user through a wearable structure;
a button portion of the wearable apparatus being pressed to trigger a button switch;
the wearable apparatus performing a corresponding operation; and
a vibration motor of the wearable apparatus sending vibration feedback when the wearable apparatus performs the operation, and/or, the vibration motor sending vibration feedback after the wearable apparatus performs the operation.

In a specific application, the user can wear the wearable apparatus through the wearable structure, and then press the button portion 111 of the front shell 11 to operate the wearable apparatus. When the wearable apparatus starts to perform the corresponding operation, the vibration motor 50 can also send vibration feedback to notify the user that the operation has started. And/or, after the wearable apparatus completes the corresponding operation, vibration feedback can be sent through the vibration motor 50, thereby notify the user that the wearable apparatus has completed the corresponding operation, without the need for the user to observe the wearable apparatus with naked eyes, which improves the user's operating experience.

As one of the optional implementation manners of this embodiment, the operation may include powering on and off, taking pictures or recording videos.

In a wearable apparatus and information notification method provided by an embodiment of the present invention, the wearable apparatus is worn on the user through a wearable structure. When the user uses the wearable apparatus to perform operations, such as powering on and off, or taking pictures, the vibration motor 50 of the wearable apparatus can send vibration feedback after performing the corresponding operations to notify the user of the state of the wearable apparatus. In this way, when the wearable apparatus is worn at a position where the user cannot observe with the naked eyes, the user can know whether the operation of the wearable apparatus has been completed without directly observing with the naked eyes, thereby the user experience is improved.

The above descriptions are only preferred embodiments of the present invention, and are not intended to limit the present invention. Any modifications, equivalent replacements or improvements made within the spirit and principles of the present invention shall be included in the protection of the present invention.

What is claimed is:

1. A wearable apparatus, comprising:
a housing;
a battery assembly;
a mainboard assembly;
a wearable structure to connect the wearable apparatus to a user; and
a vibration motor to notify the user;
wherein the mainboard assembly and the vibration motor are arranged in the housing, the battery assembly and the vibration motor are electrically connected with the mainboard assembly, and the wearable structure being connected to the housing,
the housing comprises a middle frame and a front shell connected to a front of the middle frame; the middle frame is provided with a button switch connected to the mainboard assembly; the mainboard assembly is provided with a trigger circuit, which is configured to trigger the vibration motor by the button switch; one end of the front shell is a button portion, and the button portion is disposed close to the button switch and is configured to trigger the button switch, and
the one end of the front shell is the button portion with a gap defined between the button portion and the middle frame, the other end of the front shell is a fixed portion which is connected to the middle frame, whereby the front shell forms a cantilever structure, and the button portion is configured to be pressed to trigger the button switch through the gap, or restored after removing an external force.

2. The wearable apparatus of claim 1, wherein the middle frame is provided with a button hole, and the button hole is provided with a waterproof elastic structure; one side of the button portion close to the middle frame is provided with a button protrusion facing the waterproof elastic structure.

3. The wearable apparatus of claim 1, wherein the housing further comprises a rear shell connected to a back of the middle frame, and/or, the vibration motor is adhered, glued or clamped to the middle frame.

4. The wearable apparatus of claim 1, wherein the wearable structure comprises a first magnetic structure and a wearable accessory to worn on the body or clothing of the user; the first magnetic structure is arranged in the housing and connected to a back of the housing, and the wearable accessory is provided with a second magnetic structure to attract the first magnetic structure.

5. The wearable apparatus of claim 4, wherein the wearable accessory is a magnetic lanyard or a magnetic headband or a magnetic pad.

6. The wearable apparatus of claim 1, wherein the wearable structure comprises a wearable clip to be clamped to the clothing, and the wearable clip is magnetically attracted or clipped to the housing.

7. The wearable apparatus of claim 1, wherein the wearable apparatus is a wearable camera, the wearable apparatus also comprises a lens assembly, the housing is provided with a lens hole, and the lens assembly is disposed in the lens hole; and the lens assembly and the vibration motor are respectively disposed at opposite sides of the housing.

8. An information notification method, comprising steps of:
connecting a wearable apparatus to a body or clothing of a user through a wearable structure;
triggering a button switch of the wearable apparatus when pressing a button portion of the wearable apparatus;
performing an operation using the wearable apparatus; and
sending a vibration feedback via a vibration motor when the wearable apparatus performs the operation, and/or, sending a vibration feedback via the vibration motor after the wearable apparatus performs the operation;
wherein the wearable apparatus comprises a housing, a battery assembly, a mainboard assembly, the wearable structure and the vibration motor to notify the user, the mainboard assembly and the vibration motor being arranged in the housing, the battery assembly and the vibration motor are electrically connected with the mainboard assembly, and the wearable structure being connected to the housing,
the housing comprises a middle frame and a front shell connected to a front of the middle frame; the middle frame is provided with a button switch connected to the mainboard assembly; the mainboard assembly is provided with a trigger circuit, which is configured to trigger the vibration motor by the button switch; one end of the front shell is a button portion, and the button portion is disposed close to the button switch and is configured to trigger the button switch, and
the one end of the front shell is the button portion with a gap defined between the button portion and the middle frame, the other end of the front shell is a fixed portion which is connected to the middle frame, whereby the front shell forms a cantilever structure, and the button portion is configured to be pressed to trigger the button switch through the gap, or restored after removing an external force.

9. The information notification method of claim 8, wherein the operation comprises powering on, powering off, taking pictures or recording videos.

10. The wearable apparatus of claim 7, wherein a lens ring is sleeved on the lens assembly; a lens protector is provided at a front end of the lens assembly and protrudes from the housing; and a waterproof ring is provided between the lens ring and the lens protector.

11. The wearable apparatus of claim 1, wherein the vibration motor is fitted close to an inner wall of the middle frame, whereby the vibration motor is configured to transmit vibration to user's skin through the housing as much as possible.

12. The wearable apparatus of claim 1, comprising two or more vibration motors in the housing to notify the user.

13. The wearable apparatus of claim 3, wherein the vibration motors is attached to the rear shell so as to be closest to user's skin.

14. The wearable apparatus of claim 1, wherein the vibration motor is a linear motor or a rotor motor.

15. The wearable apparatus of claim 1, comprising a pogo pin for charging or data transmission.

16. The wearable apparatus of claim 1, comprising a microphone; the housing defines a microphone hole; the microphone faces the microphone hole; a waterproof breathable membrane is provided behind the microphone hole for transmitting sound of the microphone while preventing liquid entering the housing.

* * * * *